(No Model.)
J. MACPHAIL & F. M. NEEDHAM.
VEHICLE WHEEL.
No. 366,332. Patented July 12, 1887.
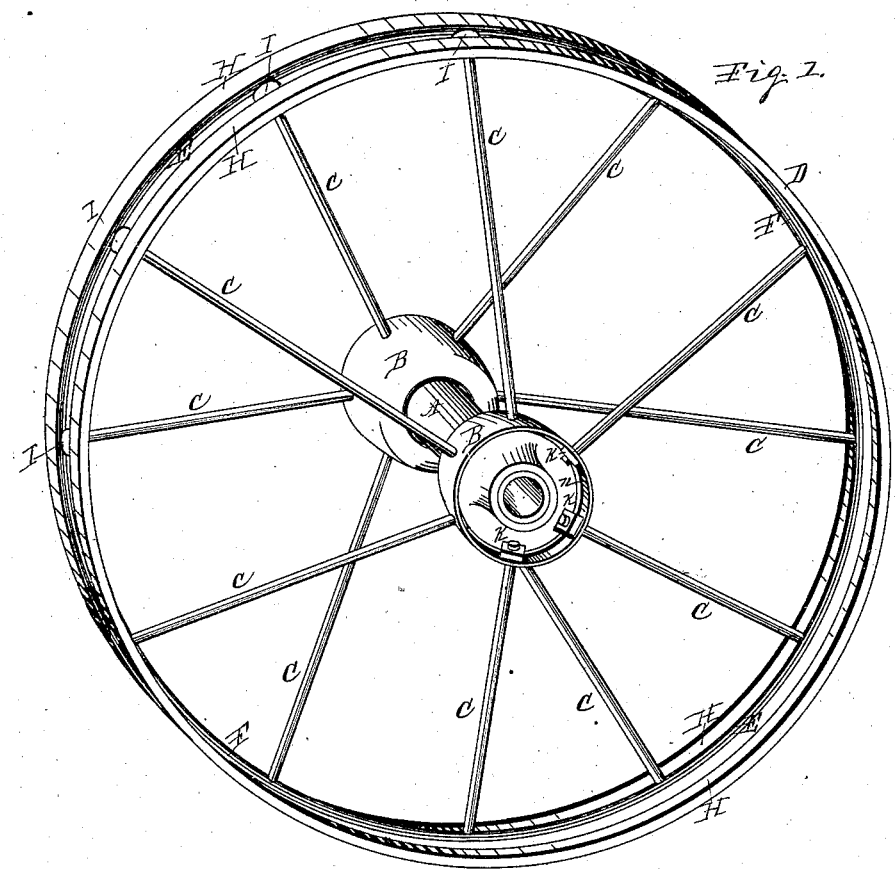
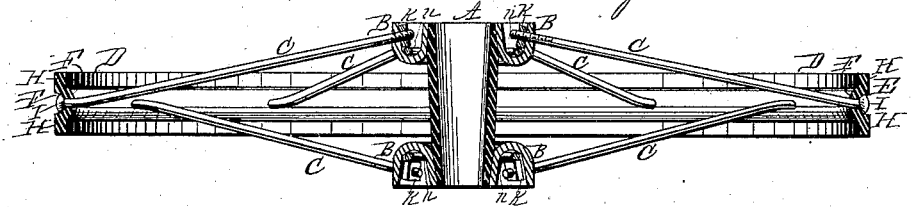

UNITED STATES PATENT OFFICE.

JAMES MACPHAIL AND FRANKLIN M. NEEDHAM, OF ROCKFORD, ILLINOIS.

VEHICLE-WHEEL.

SPECIFICATION forming part of Letters Patent No. 366,332, dated July 12, 1887.

Application filed February 20, 1886. Serial No. 192,683. (No model.)

*To all whom it may concern:*

Be it known that we, JAMES MACPHAIL and FRANKLIN M. NEEDHAM, citizens of the United States, residing in the city of Rockford, in the county of Winnebago and State of Illinois, have invented a new and useful Vehicle-Wheel, of which the following is a specification.

This invention relates to a class of wheels known as the "tension-wheel," largely employed in the manufacture of wheeled agricultural implements. Its object is the production of a light-weight wheel of great strength, capable of ready renewal in its several parts, but more especially in its parts most subject to wear. To this end we have designed and constructed the wheel represented in the accompanying drawings, in which—

Figure 1 is an isometrical representation of a wheel embodying our invention. Fig. 2 is a transverse central section thereof.

The hub of our improved wheel is composed of three parts, consisting of a central portion, A, and end portions, B. The central portion, A, is produced in thimble form to receive the axle-arm of a vehicle to revolve thereon. The end portions of the thimble are produced in truncated conic form of least diameter at their extreme ends. The end portions, B, of the hub are produced in annular ring form, and in section are of the horseshoe or U form, and their axial openings are of a conformation to receive the conic ends of the thimble snugly. The annular ring portions B, forming the hub ends, are perforated at proper intervals to receive the inner end of the spokes C.

The rim D of the wheel is produced with a central depression, E, in its tread-face, and a corresponding elevation, F, on its inner face, leaving the tread portions H on its edges in the same plane. The rim is curved in annular ring form, and its ends are joined by a weld, in the usual manner. The rim is centrally perforated at equal intervals to correspond with the perforations in the annular hub-rings to receive the spokes. The spokes C are produced from rod or bar material cut to proper lengths, and are formed at one end with a head, I, to enter the central depression on the tread-face of the rim, and their inner ends are screw-threaded to receive a screw-nut.

The spokes are passed through the rim from the outside, and their screw-threaded ends are passed through the perforated hub ends and receive a screw-nut, K, on the inner face of the annular hub ends, by which to produce the required tension on the spokes to place the rim in proper position relatively with the hub and hold the rim with sufficient firmness to give it the required sustaining power.

An open ring, N, of suitable material, is placed in the annular ring hub ends inside of the screw-nuts on the spoke ends, and by reason of the spring action of the material is forced outward against the inner surface of the hub, and operates as a lock to the screw-nuts to prevent their turning or accidental displacement.

When for any purpose it is required to turn the screw-nuts, the open-ring locking mechanism is readily removed by pressing one of its free ends inward, to pass the inner face of the screw-nut, and outward between the spokes, when it can be drawn from the hub.

In this construction of wheel the thimble portion, most subject to wear and most difficult to repair in wheels as usually constructed, is made renewable at a very small expense, with little labor, and without injuring the wheel, all of which is accomplished by loosening the screw-nuts on the spoke ends sufficient to permit the removal of the worn thimble and the insertion of a new one.

We have represented our improved wheel produced with a rim having a central depression on its tread-face and a corresponding elevation on its inner face, which is a form of rim to be preferred; but any other form of rim capable of use in connection with our improved hub may be employed.

We have also constructed the hub of our improved wheel having a thimble with truncated ends, and the hub ends with axial openings to receive the conic ends of the thimble; but other known forms—such as the cylinder with shoulder-strap to receive the annular hub ends—may be employed.

We claim as our invention—

The combination, with the hub ends and with the screw-nuts, of the spoke ends of a nut-lock ring, substantially as and for the purpose set forth.

JAMES MACPHAIL.
FRANKLIN M. NEEDHAM.

Witnesses:
A. O. BEHEL,
S. A. D. BEHEL.